(12) United States Patent
Young et al.

(10) Patent No.: US 11,001,734 B2
(45) Date of Patent: May 11, 2021

(54) ADHESIVE COMPOSITION FOR USE IN ROOFING MATERIALS

(71) Applicant: SEAL BOND, INC., Spring Lake, MI (US)

(72) Inventors: Patrick H. Young, North Shores, MI (US); Nathaniel P. Stoller, Grand Rapids, MI (US)

(73) Assignee: Seal Bond, Inc., Spring Lake, MI (US)

( * ) Notice: Subject to any disclaimer, the term of this patent is extended or adjusted under 35 U.S.C. 154(b) by 0 days.

(21) Appl. No.: 16/573,050

(22) Filed: Sep. 17, 2019

(65) Prior Publication Data

US 2020/0095478 A1    Mar. 26, 2020

Related U.S. Application Data

(60) Provisional application No. 62/733,880, filed on Sep. 20, 2018.

(51) Int. Cl.
| | |
|---|---|
| *C09J 9/00* | (2006.01) |
| *E04D 5/14* | (2006.01) |
| *C09J 167/00* | (2006.01) |
| *C09J 175/04* | (2006.01) |
| *C09J 171/00* | (2006.01) |

(52) U.S. Cl.
CPC .............. *C09J 9/00* (2013.01); *C09J 167/00* (2013.01); *C09J 171/00* (2013.01); *C09J 175/04* (2013.01); *E04D 5/148* (2013.01)

(58) Field of Classification Search
CPC . C09J 9/00; C09J 167/00; C09J 175/04; C09J 171/00; C09J 171/02; E04D 5/148; E04D 2015/042; C08G 63/695; C08G 65/336; C08G 18/837; C08K 2003/265
See application file for complete search history.

(56) References Cited

U.S. PATENT DOCUMENTS

| | | | |
|---|---|---|---|
| 6,060,560 A * | 5/2000 | St. Clair | C08G 18/10 525/124 |
| 6,388,010 B1 * | 5/2002 | St. Clair | C08G 18/10 428/424.8 |
| 6,579,924 B2 | 6/2003 | Georgeau et al. | |
| 6,679,018 B2 * | 1/2004 | Georgeau | E04D 5/12 52/408 |
| 7,317,051 B2 | 1/2008 | Georgeau et al. | |
| 7,772,301 B2 | 8/2010 | Fensel et al. | |
| 8,419,872 B2 | 4/2013 | Smith | |
| 8,512,508 B2 | 8/2013 | Fensel et al. | |
| 8,791,185 B2 * | 7/2014 | Walther | C09J 167/02 524/287 |
| 9,410,062 B1 | 8/2016 | Khan et al. | |
| 9,512,342 B1 | 12/2016 | Gutman | |
| 9,745,473 B2 | 8/2017 | Smith et al. | |
| 9,834,710 B2 * | 12/2017 | Allen | C08G 18/12 |
| 10,550,575 B2 * | 2/2020 | Tang | E04D 5/148 |
| 2005/0107499 A1 * | 5/2005 | Georgeau | C09D 195/00 524/59 |
| 2007/0231571 A1 * | 10/2007 | Lane | B29C 48/08 428/354 |

(Continued)

*Primary Examiner* — Brent W Herring
(74) *Attorney, Agent, or Firm* — Ulmer & Berne, LLP; Brian Turung; Eric Robbins

(57) ABSTRACT

A moisture curable, non-bitumen based and non-asphaltic based adhesive includes an extender, a compatibilizer, and a polymer, wherein the polymer includes reactive silyl groups.

32 Claims, 1 Drawing Sheet

(56) References Cited

U.S. PATENT DOCUMENTS

| | | | | |
|---|---|---|---|---|
| 2008/0085954 | A1* | 4/2008 | Fensel | C09J 195/00 |
| | | | | 524/68 |
| 2010/0236714 | A1* | 9/2010 | Fensel | E04D 5/148 |
| | | | | 156/329 |
| 2011/0232825 | A1* | 9/2011 | Mack | C09K 3/10 |
| | | | | 156/71 |
| 2011/0308730 | A1* | 12/2011 | Walther | C09J 175/04 |
| | | | | 156/329 |
| 2012/0138206 | A1* | 6/2012 | Wagner | C08K 5/12 |
| | | | | 156/60 |
| 2012/0225983 | A1* | 9/2012 | Wagner | C09J 11/06 |
| | | | | 524/296 |
| 2013/0274401 | A1* | 10/2013 | Allen | C08G 18/44 |
| | | | | 524/445 |
| 2015/0083326 | A1* | 3/2015 | Allen | C09J 175/06 |
| | | | | 156/331.7 |
| 2015/0344751 | A1* | 12/2015 | Allen | C08G 18/089 |
| | | | | 528/85 |

* cited by examiner

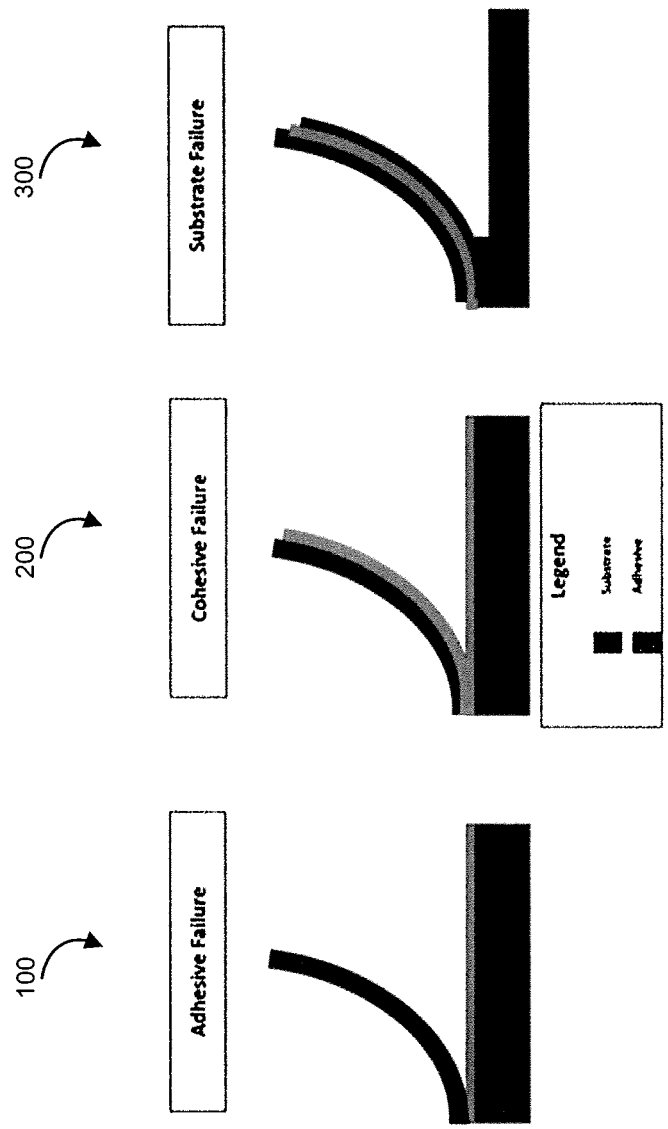

ADHESIVE COMPOSITION FOR USE IN ROOFING MATERIALS

The present disclosure claims priority on United States Provisional Patent Application Ser. No. 62/733,880 filed Sep. 20, 2018, which is incorporated herein by reference.

The disclosure relates in general to an adhesive composition, and more particularly to an adhesive composition for use in roofing materials.

BACKGROUND ON THE INVENTION

Flexible roofing membranes are commonly formed of bitumen that has been modified by thermoplastic polymers such as block elastomers, such as styrene butadiene styrene (SBS), styrene ethylene butadiene styrene (SEBS), etc., or plastomers, such as polyolefin, for example, PPA, EVA, PPI, Amorphous polyolefin (APAO), etc.

In view of the prior art, there remains a need for an improved moisture curable non-bitumen based adhesive that can be used in roofing materials.

SUMMARY OF THE DISCLOSURE

The disclosure is directed to a moisture curable, non-bitumen and non-asphaltic based adhesive. The moisture curable, non-bitumen and non-asphaltic based adhesive includes extender, compatibilizer and polymer. The polymer includes reactive silyl groups. In one non-limiting embodiment, the moisture curable, non-bitumen and non-asphaltic based adhesive is a one part adhesive. In another non-limiting embodiment, the moisture curable, non-bitumen and non-asphaltic based adhesive is substantially free of volatile organic compounds (i.e., less than 0.5 wt. %, typically less than 0.1 wt. %, and more typically less than 0.05 wt. %), and/or is substantially free of isocyanate groups (i.e., less than 0.5 wt. %, typically less than 0.1 wt. %, and more typically less than 0.05 wt. %). In one non-limiting example, the moisture curable, non-bitumen and non-asphaltic based adhesive is substantially free or is 100% free of asphalt, bitumen, coal tar, and volatile solvents. In another non-limiting example, the moisture curable, non-bitumen and non-asphaltic based adhesive is substantially free or is 100% free of asphalt, bitumen, coal tar, volatile solvents, and isocyanate groups.

In another and/or alternative non-limiting aspect of the disclosure, one or more of the reactive silyl groups in the polymer are selected from the group consisting of a polyether having reactive silyl groups, a polyurethane having reactive silyl groups, and a polyester having reactive silyl groups. Non-limiting examples of polymer including reactive silyl groups include silylated polyurethane, silylated polyethers, silylated acrylics, and silylated polyesters. In one non-limiting embodiment, the silylated polymers or silyl-terminated polymers can include two or more reactive silyl groups. In one non-limiting specific example, the polymer includes alpha, omega-telechelic silane-terminated polymers. In another non-limiting embodiment, the polymer content in the moisture curable, non-bitumen and non-asphaltic based adhesive is generally at least about 10 wt. %, and typically 10-31 wt. % (and all values and arranges therebetween). In one non-limiting example, the polymer content in the moisture curable, non-bitumen and non-asphaltic based adhesive is 10-25 wt. %, and typically 12-20 wt. %.

In another and/or alternative non-limiting aspect of the disclosure, non-limiting examples of moisture cure isocyanate terminated polymers that can be used to form polymer having reactive silyl groups include any moisture curable polyurethane or polyurea prepolymer comprised of excess isocyanate reacted with one or more active hydrogen containing molecules.

In another and/or alternative non-limiting aspect of the disclosure, non-limiting examples of active hydrogen-containing molecules useful in the preparation of polyurethane prepolymers include, but are not limited to, one or more of polyether, polyester, polyalkyldiene polyols, and/or derived from reaction of excess of such polyols, alone or in combination with isocyanate functional compounds. The polyols can be diols and/or triols. Non-limiting examples of polyols that can be used include polyoxypropylene polyol, polyalkylene polyol, and polypropylene glycols. For example, polyether diols having high equivalent weights are used. One non-limiting polyol that can be used is polyether diols. One such non-limiting specific example is polyether diols with equivalent weights ranging from greater than about 200 to about 20000 (and all values and ranges therebetween), and typically about 500 to about 5000 can be used.

In another and/or alternative non-limiting aspect of the disclosure, non-limiting examples of active hydrogen-containing molecules useful in the preparation of polyurea prepolymers include, but are not limited to, one or more of primary or secondary amine functional polyether, polyester, or polyalkyldiene polymers, and/or derived from reaction of excess of such primary amine functional polymers, alone or in combination with isocyanate functional compounds. The amine functional polymers can include difunctional or trifunctional. Non-limiting examples of useful amine functional polymers include polyoxypropyleneamine, polyalkyleneamine, and/or amine terminated polypropylene glycols. For example, polyether diamines having high equivalent weights can use used. One such non-limiting specific example is polyether diamines with equivalent weights ranging from greater than about 200 to about 20000 (and all values and ranges therebetween), and typically 500-5000 can be used.

In another and/or alternative non-limiting aspect of the disclosure, the extender can be used to facilitate affinity with both the moisture curable, non-bitumen and non-asphaltic based adhesive and a roofing membrane. The extender is believed to be an important mechanism for providing adhesion to the roofing membrane. The extender can optionally provide viscosity reduction and/or increased permeability that is suitable for improved workability and/or adequate cure throughout the moisture curable, non-bitumen and non-asphaltic based adhesive. Non-limiting extenders suitable for use in the moisture curable, non-bitumen and non-asphaltic based adhesive include esters of polybasic acids and polyhydric alcohol, or fatty acid oils/esters, or aromatic/aliphatic carboxylic acid esters, among others. Specific non-limiting extenders include, but are not limited to, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptyl nonyl adipate, dibutyl sebacate, isononyl benzoate, nonyl benzoate, isodecyl benzoate, decyl benzoate, 2-propylheptyl benzoate, isoundecylbenzoate, isotridecyl benzoate, di-heptyl cyclohexanoate, di-2-ethylhexyl cyclohexanoate, di-n-nonyl cyclohexanoate, diisononyl cyclohexanoate, di-n-decyl cyclohexanoate, diisodecyl cyclohexanoate, di-2-propyl heptyl cyclohexanoate, diheptyl adipate, dioctyl adipate, diisononyl adipate, diisodecyl adipate, di 2-propylheptyl adipate, dipropylene glycol dibenzoate, diethylene glycol dibenzoate, triethylene glycol dibenzoate, or mixtures thereof. Generally, the extender content in the moisture curable, non-bitumen and non-asphaltic based adhesive is at least 4 wt. % and up to about 45 wt. % (and all values and ranges therebetween). In one non-limiting embodiment, the extender content in the moisture curable, non-bitumen and non-asphaltic based adhesive is 5-40 wt. %, typically 8-30 wt. %, more typically 10-25 wt. %, and even more typically 12-18 wt. %.

In another and/or alternative non-limiting aspect of the disclosure, the compatibilizers can be used to compatibilize dissimilar materials to result in stable mixtures and good adhesion and stability properties of the membrane. The compatibilizers can be used to address the limited compatibility of adhesive polymers and extenders with bitumen/asphaltic roofing products, which limited compatibility can lead to unstable and/or too aggressive membrane penetration, thereby resulting in variable and/or inferior long term adhesion properties. In one non-limiting embodiment, compatibilizers of moderately polar components can be used. Non-limiting examples of compatibilizers include, but are not limited to, polyols such as, but not limited to, adipate and carbonate glycols, and/or olefinic glycols. Non-limiting specific examples of compatibilizers include polyoxyalkylene polyols (also called polyether polyols or oligoetherols, which are polymerization products of ethylene oxide, 1,2-propylene oxide, 1,2- or 2,3-butylene oxide, oxetane, tetrahydrofuran or mixtures thereof, possibly polymerized with the aid of a starter molecule having two or more active hydrogen atoms, for example water, ammonia or compounds having a plurality of oxygen-hydrogen (OH) or nitrogen-hydrogen (NH) groups). Specific non-limiting examples are polycarbonate polyol, carbonate glycols paraffinic and olefinic glycols, and/or adipate glycol (e.g., diethylene glycol adipate, ethylene glycol adipate, propylene glycol based polyether polyol diol, etc.). In one non-limiting embodiment, the compatibilizer in the moisture curable, non-bitumen and non-asphaltic based adhesive is at least 2 wt. % and up to 45 wt. % (and all values and ranges therebetween). In one non-limiting embodiment, the compatibilizer content in the moisture curable, non-bitumen and non-asphaltic based adhesive is 2.1-42 wt. %, typically 3-40 wt. %, more typically 4-32 wt. %, still more typically 5-24 wt. %, and even more typically 8-15 wt. %. The weight ratio of the extender to the compatibilizer in the moisture curable, non-bitumen and non-asphaltic based adhesive is 1:1 to 5:1 (and all values and ranges therebetween), and typically 1:1-3:1, and more typically 1.1:1-2:1. In one non-limiting formulation, the extender constitutes a larger weight percent than the compatibilizer in the moisture curable, non-bitumen and non-asphaltic based adhesive.

In another and/or alternative non-limiting aspect of the disclosure, the moisture curable, non-bitumen and non-asphaltic based adhesive includes one or more of adhesion promoter, antioxidant, catalyst, dehydration agent, filler and/or tackifier.

In another and/or alternative non-limiting aspect of the disclosure, the adhesion promoter, when included in the moisture curable, non-bitumen and non-asphaltic based adhesive, is used to improve the adhesion of the moisture curable, non-bitumen and non-asphaltic based adhesive with a roofing membrane (e.g., modified bitumen membrane, EPDM membrane, etc.). Non-limiting adhesion promoters include silane adhesion promoters (e.g., N-(2-aminoethyl)-3-aminopropyltrimethoxysilane, etc.). The one or more adhesion promoters, when used, are provided to facilitate adhesion of the moisture curable, non-bitumen and non-asphaltic based adhesive to a variety of substrates. Non-limiting examples of adhesion promoters that can be used in the moisture curable, non-bitumen and non-asphaltic based adhesive include, but are not limited to, silane coupling agents having a functional group such as a mercapto group, an epoxy group, a carboxyl group, a vinyl group, an isocyanate group, isocyanurate, halogen, or an amino group. Specific non-limiting examples of adhesion promoters include isocyanate group-containing silanes such as 3-Isocyanatopropyltrimethoxysilane, 3-isocyanatopropyltriethoxysilane, 3-isocyanatopropylmethyldiethoxysilane, and 3-isocyanatepropylmethyldimethoxysilane; amino group-containing silanes such as (3-aminopropyl)trimethoxysilane, (3-aminopropyl)triethoxysilane, (3-aminopropyl)triisopropoxysilane, (3-aminopropyl)methyldimethoxysilane, (3-aminopropyl)methyldiethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropylmethyldiethoxysilane, N-(2-aminoethyl)-3-aminopropyltriisopropoxysilane, (3-ureidopropyl)trimethoxysilane, N-phenyl-3-aminopropyltrimethoxysilane, N-benzyl-3-aminopropyltrimethoxysilane, and N-vinylbenzyl-3-aminopropyltriethoxysilane; mercapto group-containing silanes such as (3-mercaptopropyl)trimethoxysilane, (3-mercaptopropyl)triethoxysilane, (3-mercaptopropyl)methyldimethoxysilane, and (3-mercaptopropyl)methyldiethoxysilane; epoxy group-containing silanes such as (3-glycidoxypropyl)trimethoxysilane, (3-glycidoxypropyl)triethoxysilane, (3-glycidoxypropyl)methyldimethoxysilane, 2-(3,4-epoxycyclohexyl)ethyltrimethoxysilane, and 2-(3,4-epoxycyclohexyl)ethyltriethoxysilane; vinyl type unsaturated group-containing silanes such as vinyltrimethoxysilane, vinyltriethoxysilane, (3-acroyloxypropyl)methyltriethoxysilane; halogen-containing silanes such as (3-chloropropyl)trimethoxysilane; isocyanurate silanes such as tris(trimethoxysilyl)isocyanurate, polysulfanes such as bis(3-triethoxysilylpropyl)tetrasulfane, and the like can be also used as the adhesion promoter. In one non-limiting embodiment, the adhesion promoter content in the moisture curable, non-bitumen and non-asphaltic based adhesive is at least 0.01 wt. % and up to 4 wt. % (and all values and ranges therebetween), typically 0.01-2 wt. %, more typically 0.01-1.5 wt. %, even more typically 0.01-0.5 wt. %, and still even more typically 0.01-0.1 wt. %.

In another and/or alternative non-limiting aspect of the disclosure, the antioxidant, when included in the moisture curable, non-bitumen and non-asphaltic based adhesive, is used to improve the stability of the moisture curable, non-bitumen and non-asphaltic based adhesive. Non-limiting antioxidants that can be used include Irgonox® 1010 (BASF) (pentaerythritol tetrakis(3-(3,5-di-tert-butyl-4-hydroxyphenyl)propionate), Irgonox® 245 (BASF) (ethylene bis (oxyethylene) bis-(3-(5-tert-butyl-4-hydroxy-m-tolyl)-propionate), and CYASORB® (Cytec) Ultraviolet (UV) stabilizers (e.g., amine light stabilizer concentrate in polypropylene, 2-Hydroxy-4-n-octoxybenzophenone, 1,6-Hexanediamine, N,N'-bis(2,2,6,6-tetramethyl-4-piperidinyl)-, Polymers with morpholine-2,4,6-trichloro1,3,5-triazine, etc.). In one non-limiting embodiment, the antioxidant content in the moisture curable, non-bitumen and non-asphaltic based adhesive is at least 0.001 wt. % and up to 5 wt. % (and all values and ranges therebetween), typically 0.01-5 wt. %, more typically 0.01-1 wt. %, and even more typically 0.01-0.6 wt. %.

In another and/or alternative non-limiting aspect of the disclosure, the catalyst, when included in the moisture curable, non-bitumen and non-asphaltic based adhesive, is used to promoting curing of the silyl-terminated polymer. Non-limiting catalysts that can be used include dibutyltin dilaurate, dibutyltin oxide, dimethylcyclohexylamine (DM-CHA), dimethylethanolamine (DMEA), dioctyltin mercaptide, and N-tin mercaptides. In one non-limiting embodiment, the catalyst content in the moisture curable, non-bitumen and non-asphaltic based adhesive is at least 0.01 wt. % and up to 1 wt. % (and all values and ranges therebetween), typically 0.01-0.5 wt. %, and more typically 0.1-0.4 wt. %.

In another and/or alternative non-limiting aspect of the disclosure, the dehydration agent, when included in the moisture curable, non-bitumen and non-asphaltic based adhesive, is used to improve storage stability of the moisture curable, non-bitumen and non-asphaltic based adhesive. Dehydrating and drying methods include 1) heat drying in the case that the components are solids such as powder and 2) vacuum dehydration and dehydration using a substance such as synthetic zeolite, active alumina, silica gel, quick lime, and magnesium oxide in the case that the components are liquids. The moisture curable, non-bitumen and non-asphaltic based adhesive can be stabilized by adding a lower alcohol such as methanol and ethanol; or an alkoxysilane compound such as n-propyltrimethoxysilane, vinyltrimethoxysilane, vinylmethyldimethoxysilane, methyl silicate, ethyl silicate, (3-mercaptopropyl)methyldimethoxysilane, (3-mercaptopropyl)methyldiethoxysilane, and (3-glycidoxypropyl)trimethoxysilane, an organosilane possessing a reactive vinyl group and/or a silyl group (e.g., trimethoxyvinylsilane, vinyltrimethoxysilane, etc.). In one non-limiting embodiment, the dehydration agent content in the moisture curable, non-bitumen and non-asphaltic based adhesive is at least 0.05 wt. % and up to 2 wt. % (and all values and ranges therebetween), typically 0.05-1.5 wt. %, and more typically 0.05-0.4 wt. %.

In another and/or alternative non-limiting aspect of the disclosure, the filler, when included in the moisture curable, non-bitumen and non-asphaltic based adhesive, is used as needed in the range not to impair the properties of the moisture curable, non-bitumen and non-asphaltic based adhesive. Fillers may be used as a reinforcement, UV stability, flame retardancy, color, etc. Non-limiting examples of fillers include wood meal, walnut shell flour, rice hull flour, pulp, cotton chips, mica, graphite, diatomaceous earth, china clay, kaolin, clay, talc, fumed silica, precipitated silica, silicic anhydride, quartz powder, glass beads, calcium carbonate, magnesium carbonate, titanium oxide, carbon black, glass balloons, aluminum powder, zinc powder, asbestos, glass fiber and/or carbon fiber. In one non-limiting embodiment, the filler content in the moisture curable, non-bitumen and non-asphaltic based adhesive is at least 20 wt. % and up to 70 wt. % (and all values and ranges therebetween), typically 20-60 wt. %, and more typically 20-40 wt. %.

In another and/or alternative non-limiting aspect of the disclosure, the tackifier, when included in the moisture curable, non-bitumen and non-asphaltic based adhesive, is used to increase formulation tack so as to add adhesive strength to a substrate. Non-limiting tackifiers that can be used includes virtually any hydrocarbon oil or mixture thereof that is commonly used in bitumen and/or coal tar compounding or as a plasticizer and processing aid, such as, but not limited to, a naphthenic oil or aromatic resins containing varying aromatic contents, such as aromatic resins, can be used but is not necessary. The tackifier should be compatible with other components of the moisture curable, non-bitumen and non-asphaltic based adhesive. Specific non-limiting examples of tackifiers include aromatic resins such as C9, C5, and/or coumarone indene resins, naphthenic oils such as Sundex 790T from Sunoco, Pro-Guard Altranap 1000 from Lynden Oil Co., and Amplex® 100 from Citgo. In one non-limiting embodiment, the tackifier content in the moisture curable, non-bitumen and non-asphaltic based adhesive is at least 0.01 wt. % and up to 30 wt. % (and all values and ranges therebetween), typically 0.5-5 wt. %, and more typically about 1-3 wt. %.

In another and/or alternative non-limiting aspect of the disclosure, the moisture curable, non-bitumen and non-asphaltic based adhesive can optionally include one or more other additives such as, but not limited to, stabilizer, ultraviolet absorber, metal deactivator, light stabilizer, thixotropic agent, amine type radical chain inhibitor, phosphorus-containing peroxide decomposer, lubricant, pigment, foaming agent, anti-foaming agent, flame retardant and/or antistatic agent. The total content of these optional additives in the moisture curable, non-bitumen and non-asphaltic based adhesive generally does not exceed 5 wt. %, and typically does not exceed 2 wt. %

In another and/or alternative non-limiting aspect of the disclosure, the moisture curable, non-bitumen and non-asphaltic based adhesive is formulated to form a peel strength with a roofing membrane (e.g., modified bitumen membrane, EPDM polymer membrane, etc.) that is greater than 1 pound per linear inch (pli), and typically greater than 2 pli. In one non-limiting embodiment, the moisture curable, non-bitumen and non-asphaltic based adhesive is formulated to form a peel strength with a roofing membrane of 1-6 pound-force (lbf) after one week of application (and all values and ranges therebetween) and 1.8-7 lbf after three weeks of application (and all values and ranges therebetween), typically 1.5-5.5 lbf after one week of application and 2-5.6 lbf after three weeks of application, and more typically 1.6-5 lbf after one week of application and 2.1-5 lbf after three weeks of application.

In another and/or alternative non-limiting aspect of the disclosure, the moisture curable, non-bitumen and non-asphaltic based adhesive has a tensile strength at point of breakage per ASTM D 413 of at least 70 ksi and up to 250 ksi (and all values and ranges therebetween), and an elongation of at least 250% and up to 800% (and all values and ranges therebetween). In one non-limiting embodiment, the moisture curable, non-bitumen and non-asphaltic based adhesive has a tensile strength at point of breakage per ASTM D 413 of 72-190 ksi and an elongation of 300-750%, and typically 77-150 ksi and an elongation of 340-730%.

In another and/or alternative non-limiting aspect of the disclosure, the moisture curable, non-bitumen and non-asphaltic based adhesive is formulated to a have a substrate failure of less than 10% of the total failure mechanism in the peel of two modified bitumen membranes that are adhesively connected. As defined herein, 'substrate failure' is defined as mechanical failure of the substrate while preserving integrity of both the adhesive bond and the cohesive bond of the adhesive material characterized by a visual observation noting the presence of substrate material still adhered to the adhesive material after the test specimen has been pulled apart. As such, if more than 10% of the surface area of each side of the adhesive layer is secured to and covered by a portion of the membrane layer after the adhesively connected membrane layers are separated from one another, then a substrate failure has occurred.

One non-limiting object of the present invention is the provision of a moisture curable, non-bitumen and non-asphaltic based adhesive that is substantially free of asphalt, bitumen, coal tar, volatile solvents, and/or isocyanate groups.

Another and/or alternative non-limiting object of the present invention is the provision of a moisture curable, non-bitumen and non-asphaltic based adhesive that includes extender, compatibilizer and polymer.

Another and/or alternative non-limiting object of the present invention is the provision of a moisture curable, non-bitumen and non-asphaltic based adhesive that includes extender, compatibilizer and polymer, wherein the polymer includes reactive silyl groups.

Another and/or alternative non-limiting object of the present invention is the provision of a moisture curable, non-bitumen and non-asphaltic based adhesive that includes extender, compatibilizer and polymer that is one part adhesive.

Another and/or alternative non-limiting object of the present invention is the provision of a moisture curable, non-bitumen and non-asphaltic based adhesive that optionally includes one or more of adhesion promoter, antioxidant, catalyst, dehydration agent, filler and/or tackifier.

Another and/or alternative non-limiting object of the present invention is the provision of a moisture curable, non-bitumen and non-asphaltic based adhesive that can optionally include one or more other additives such as, but not limited to, stabilizer, ultraviolet absorber, metal deactivator, light stabilizer, thixotropic agent, amine type radical chain inhibitor, phosphorus-containing peroxide decomposer, lubricant, pigment, foaming agent, anti-foaming agent, flame retardant and/or antistatic agent.

Another and/or alternative non-limiting object of the present invention is the provision of a moisture curable, non-bitumen and non-asphaltic based adhesive that is formulated to form a peel strength with a roofing membrane that is greater than 1 pound per linear inch (pli).

Another and/or alternative non-limiting object of the present invention is the provision of a moisture curable, non-bitumen and non-asphaltic based adhesive that is formulated to form a peel strength with a roofing membrane of 1-6 pound-force (lbf) after one week of application and 1.8-7 lbf after three weeks of application.

Another and/or alternative non-limiting object of the present invention is the provision of a moisture curable, non-bitumen and non-asphaltic based adhesive that has a tensile strength at point of breakage per ASTM D 413 of at least 70 ksi and up to 250 ksi, and an elongation of at least 250% and up to 800%.

Another and/or alternative non-limiting object of the present invention is the provision of a moisture curable, non-bitumen and non-asphaltic based adhesive that has a substrate failure of less than 10% of the total failure mechanism in the peel of two modified bitumen membranes that are adhesively connected.

Another and/or alternative non-limiting object of the present invention is the provision of a moisture curable, non-bitumen and non-asphaltic based adhesive that comprises at least 4 wt. % extender, at least 2 wt. % compatibilizer, and at least 10 wt. % polymer, and wherein the polymer includes reactive silyl groups.

Another and/or alternative non-limiting object of the present invention is the provision of a moisture curable, non-bitumen and non-asphaltic based adhesive that comprises 4-45 wt. % extender, 2-45 wt. % compatibilizer, and 10-31 wt. % polymer, and wherein the polymer includes reactive silyl groups, and wherein one or more of the reactive silyl groups in the polymer are selected from the group consisting of a polyether having reactive silyl groups, a polyurethane having reactive silyl groups, and a polyester having reactive silyl groups.

Another and/or alternative non-limiting object of the present invention is the provision of a moisture curable, non-bitumen and non-asphaltic based adhesive that further includes one or more of adhesion promoter, antioxidant, catalyst, dehydration agent, filler and/or tackifier.

Another and/or alternative non-limiting object of the present invention is the provision of a moisture curable, non-bitumen and non-asphaltic based adhesive that includes one or more of at least 0.01 wt. % adhesion promoter, at least 0.001 wt. % antioxidant, at least 0.1 wt. % catalyst, at least 0.05 wt. % dehydration agent, at least 20 wt. % filler, and/or at least 0.01 wt. % tackifier.

Another and/or alternative non-limiting object of the present invention is the provision of a moisture curable, non-bitumen and non-asphaltic based adhesive that further includes 0.01-4 wt. % adhesion promoter, 0.05-0.5 wt. % antioxidant, 0.05-2 wt. % dehydration agent, 20-70 wt. % filler, and 0.1-1 wt. % catalyst.

Another and/or alternative non-limiting object of the present invention is the provision of a moisture curable, non-bitumen and non-asphaltic based adhesive that includes 0.01-0.1 wt. % adhesion promoter, 0.05-0.35 wt. % antioxidant, 0.05-0.3 wt. % dehydration agent, 20-35 wt. % filler, and 0.1-0.4 wt. % catalyst.

Another and/or alternative non-limiting object of the present invention is the provision of a moisture curable, non-bitumen and non-asphaltic based adhesive that includes tackifier.

Another and/or alternative non-limiting object of the present invention is the provision of a moisture curable, non-bitumen and non-asphaltic based adhesive that forms a peel strength of with a roofing membrane that is greater than 1 pli.

Another and/or alternative non-limiting object of the present invention is the provision of a moisture curable, non-bitumen and non-asphaltic based adhesive that forms a peel strength of with a roofing membrane that is greater than 2 pli.

Another and/or alternative non-limiting object of the present invention is the provision of a moisture curable, non-bitumen and non-asphaltic based adhesive wherein the weight ratio of said extender to said compatibilizer is 1:1 to 5:1.

Another and/or alternative non-limiting object of the present invention is the provision of a moisture curable, non-bitumen and non-asphaltic based adhesive wherein the compatibilizer includes one or more compounds selected from the group consisting of adipate glycols, carbonate glycols paraffinic and olefinic glycols.

Another and/or alternative non-limiting object of the present invention is the provision of a moisture curable, non-bitumen and non-asphaltic based adhesive wherein the extender includes one or more compounds selected from the group consisting of polybasic acids and polyhydric alcohols.

Another and/or alternative non-limiting object of the present invention is the provision of a moisture curable, non-bitumen and non-asphaltic based adhesive wherein the tackifier includes one or more compounds selected from the group consisting of naphthenic oil and aromatic resins.

Another and/or alternative non-limiting object of the present invention is the provision of a moisture curable, non-bitumen and non-asphaltic based adhesive wherein the polymer includes an α, Ω telechelic silyl-terminated polymer.

Another and/or alternative non-limiting object of the present invention is the provision of an adhered roofing system comprising a) a roof substrate; b) a roofing membrane; and c) a cured adhesive, wherein the cured adhesive is a cured product of a moisture curable, non-bitumen and non-asphaltic based adhesive, and wherein the roof membrane optionally is a modified bitumen membrane or an EPDM polymer membrane.

These and other objects, features and advantages of the present invention will become apparent in light of the following detailed description of preferred embodiments thereof, as illustrated in the accompanying drawing.

BRIEF DESCRIPTION OF THE DRAWING

Reference may now be made to the drawing, which illustrates various embodiments that the invention may take in physical form and in certain parts and arrangement of parts wherein:

FIG. 1 illustrates examples of different types of failure modes in a peel test, in accordance with at least one possible embodiment.

DETAILED DESCRIPTION OF A
NON-LIMITING EMBODIMENT

A more complete understanding of the articles/devices, processes, and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

While this invention is susceptible of embodiments in many different forms, there is shown in the drawings and described herein in detail specific embodiments with the understanding that the present disclosure is to be considered as an exemplification and is not intended to be limited to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

The proposed embodiments provide an example low cost moisture curable, non-bitumen and non-asphaltic based adhesive. In some non-limiting embodiments, the moisture curable, non-bitumen and non-asphaltic based adhesive contains a moisture curable polymer having reactive silyl groups or crosslinkable isocyanate endgroups and at least one extender and compatibilizer that provides a high peel strength useful in asphaltic and rubber-based membranes. The moisture curable, non-bitumen and non-asphaltic based adhesive is also free or substantially free of carcinogens such as asphalt, coal tar, and volatile solvents. In one non-limiting example, the moisture curable, non-bitumen and non-asphaltic based adhesive is substantially free of volatile organic compounds. In another non-limiting example, the moisture curable, non-bitumen and non-asphaltic based adhesive is substantially free of isocyanate groups.

An example one-part, moisture curable, non-bitumen and non-asphaltic based adhesive in accordance with one non-limiting embodiment comprises a silyl-terminated polymer, an extender, compatibilizer and a catalyst for promoting curing of the silyl-terminated polymer. In some embodiments, other non-limiting ingredients may be included in the one-part, moisture curable, non-bitumen and non-asphaltic based adhesive, with the other non-limiting ingredients including one or more fillers, tackifiers, antioxidants, ultraviolet absorbers, adhesion promoters, dehydrating agents, and/or colorants.

In accordance with certain aspects of the embodiments, the moisture curable, non-bitumen and non-asphaltic based adhesive comprising several polymeric and chemical substances undergoes a specific sequence of chemical reactions and physical changes that result in strong and durable bonds between certain roof membranes and corresponding rigid construction materials. These moisture curable, non-bitumen and non-asphaltic based adhesives can be roller applied, troweled, or sprayed with airless or conventional spray systems.

In still yet additional and/or alternative non-limiting aspect of the embodiments, the moisture curable, non-bitumen and non-asphaltic based adhesive can include one or more of a dehydrating agent, compatibilizer, tackifier, stabilizer, filler, antioxidant, adhesion promoter, ultraviolet absorber, metal deactivator, antioxidant, light stabilizer, thixotropic agent, catalyst, amine-type radical chain inhibitor, phosphorus-containing peroxide decomposer, lubricant, pigment, foaming agent, anti-foaming agent, flame retardant and/or antistatic agent. In a non-limiting example, the adhesion promoter is approximately 0.01-1.0 wt. % of the moisture curable, non-bitumen and non-asphaltic based adhesive, the dehydration agent is approximately 0.05-1.5 wt. % of the moisture curable, non-bitumen and non-asphaltic based adhesive, the filler is approximately 20-35 wt. % of the moisture curable, non-bitumen and non-asphaltic based adhesive, and the catalyst is approximately 0.1-1.0 wt. % of the moisture curable, non-bitumen and non-asphaltic based adhesive.

An extender(s) can be utilized that facilitates affinity with both the moisture curable, non-bitumen and non-asphaltic based adhesive and a roofing membrane. The extender is one of the mechanisms used to provide adhesion to the roofing membrane. In a non-limiting form, the extender may provide viscosity reduction and increased permeability that is suitable for improved workability and adequate cure throughout the matrix of the moisture curable, non-bitumen and non-asphaltic based adhesive. Extenders suitable for use in the moisture curable, non-bitumen and non-asphaltic based adhesive can include esters of polybasic acids and polyhydric alcohol, or fatty acid oils/esters, and/or aromatic/aliphatic carboxylic acid esters, among others. Suitable extenders include, but are not limited to, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptyl nonyl adipate, dibutyl sebacate, isononyl benzoate, nonyl benzoate, isodecyl benzoate, decyl benzoate, 2-propylheptyl benzoate, isoundecylbenzoate, isotridecyl benzoate, di-heptyl cyclohexanoate, di-2-ethylhexyl cyclohexanoate, di-n-nonyl cyclohexanoate, diisononyl cyclohexanoate, di-n-decyl cyclohexanoate, diisodecyl cyclohexanoate, di-2-propyl heptyl cyclohexanoate, diheptyl adipate, dioctyl adipate, diisononyl adipate, diisodecyl adipate, di 2-propylheptyl adipate, dipropylene glycol dibenzoate, diethylene glycol dibenzoate, triethylene glycol dibenzoate, or mixtures thereof. Generally, the extender is used in the range of 5-40 wt. % of the moisture curable, non-bitumen and non-asphaltic based adhesive. In a non-limiting embodiment, the extender is at least 4 wt. % of the moisture curable, non-bitumen and non-asphaltic based adhesive.

A non-limiting component of the moisture curable, non-bitumen and non-asphaltic based adhesive uses processing oil(s) as a tackifier that includes virtually any hydrocarbon oil or mixture thereof that is commonly used in bitumen and/or coal tar compounding or as a plasticizer and processing aid, such as a naphthenic oil or aromatic resins containing varying aromatic contents, such as aromatic resins, can be used but is not necessary. The tackifier should be compatible with other components of the moisture curable, non-bitumen and non-asphaltic based adhesive. Specific, non-limiting examples of such aromatic resins include C9, C5, and coumarone indene resins. Specific, non-limiting examples of suitable naphthenic oils include Sundex 790T from Sunoco, ProGuard Altranap 1000 from Lynden Oil Co., and Amplex® 100 from Citgo. The tackifier (when used) can be about 0.1-30 wt. % (and all values and ranges therebetween) of the moisture curable, non-bitumen and non-asphaltic based adhesive, typically about 0.5-5 wt. %, and more typically about 1-3 wt. %.

An antioxidant(s) can optionally be used in the moisture curable, non-bitumen and non-asphaltic based adhesive. The antioxidant can be used to further improve the stability of the moisture curable, non-bitumen and non-asphaltic based adhesive. The antioxidants (when used) can be about 0.01-5 wt. % moisture curable, non-bitumen and non-asphaltic based adhesive (and all values and ranges therebetween) of the moisture curable, non-bitumen and non-asphaltic based adhesive, and typically about 0.1-1 wt. %. Non-limiting antioxidants include Irgonox® 1010 (BASF), CYASORB® (Cytec) Ultraviolet (UV) stabilizers.

A catalyst(s) can optionally be used in the moisture curable, non-bitumen and non-asphaltic based adhesive. One non-limiting catalyst is dibutyltin dilaurate. The addition of a catalyst can be used to control reaction speed during the curing of the moisture curable, non-bitumen and non-asphaltic based adhesive. Care needs to be taken when using catalysts because of gelation risks. Generally, no more than 1 wt. % of catalyst is recommended, e.g., 0.01-1 wt. % and all values and ranges therebetween. Non-limiting catalysts that can be used in non-bitumen based adhesive include dibutyltin dilaurate, dibutyltin oxide, dimethylcyclohexylamine (DMCHA), dimethylethanolamine (DMEA), dioctyltin mercaptide, and N-tin mercaptides.

Examples of moisture cure silyl-terminated polymers that may be used in the moisture curable, non-bitumen and non-asphaltic based adhesive include silylated polyurethane, silylated polyethers, silylated acrylics, and silylated polyesters. The silylated polymers or silyl-terminated polymers of the embodiments include two or more reactive silyl groups, with alpha, omega-telechelic silane-terminated polymers being preferred. In a non-limiting example, the polymer is approximately 10-31 wt. % of the moisture curable, non-bitumen and non-asphaltic based adhesive, and the polymer includes reactive silyl groups.

Examples of moisture cure isocyanate terminated polymers that may be used in the moisture curable, non-bitumen and non-asphaltic based adhesive include any moisture curable polyurethane or polyurea prepolymer comprised of excess isocyanate reacted with one or more active hydrogen-containing molecules.

Examples of active hydrogen-containing molecules useful in the preparation of polyurethane prepolymers include, but are not limited to, either one or a combination of polyether, polyester, or polyalkyldiene polyols, or derived from reaction of excess of such polyols, alone or in combination with isocyanate functional compounds. The polyols can be diols or triols, preferably, polyether diols are used. Representative examples of useful polyols include polyoxypropylene polyol, polyalkylene polyol, and polypropylene glycols. In one non-limiting example, polyether diols having high equivalent weights are used. For example, polyether diols with equivalent weights ranging from greater than about 200 to about 20000, and typically about 500 to about 5000 can be used.

Examples of active hydrogen-containing molecules useful in the preparation of polyurea prepolymers include, but are not limited to, either one or a combination of primary or secondary amine functional polyether, polyester, or polyalkyldiene polymers, or derived from reaction of excess of such primary amine functional polymers, alone or in combination with isocyanate functional compounds. The amine functional polymers can be either difunctional or trifunctional. In one non-limiting embodiment, polyether diamines are used. Representative examples of useful amine functional polymers are polyoxypropyleneamine, polyalkyleneamine, and amine terminated polypropylene glycols. Polyether diamines having high equivalent weights can be used. For example, polyether diamines with equivalent weights ranging from greater than about 200 to about 20000, and typically 500-5000 can be used.

The fillers optionally used in the moisture curable, non-bitumen and non-asphaltic based adhesive can include, but are not limited to, wood meal, walnut shell flour, rice hull flour, pulp, cotton chips, mica, graphite, diatomaceous earth, china clay, kaolin, clay, talc, fumed silica, precipitated silica, silicic anhydride, quartz powder, glass beads, calcium carbonate, magnesium carbonate, titanium oxide, carbon black, glass balloons, aluminum powder, zinc powder, asbestos, glass fiber and carbon fiber. The above fillers can be used individually or in combination.

The limited compatibility of adhesive polymers and extenders with bitumen/asphaltic roofing products often leads to unstable and/or too aggressive membrane penetration and thereby results in variable and/or inferior long term adhesion properties. Compatibilizers of moderately polar component can be used to compatibilize dissimilar materials and have been found, when used in the moisture curable, non-bitumen and non-asphaltic based adhesive, to result in stable mixtures and good adhesion and stability properties of the membrane. Examples of compatibilizers include, but are not limited to, adipate and carbonate glycols and olefinic glycols. Generally, the compatibilizer is at least 2 wt. % of the moisture curable, non-bitumen and non-asphaltic based adhesive. In one non-limiting embodiment, a weight ratio between the extender and the compatibilizer in the moisture curable, non-bitumen and non-asphaltic based adhesive is about 1:1 to 5:1.

Suitable polyols that can be used as the compatibilizer include one or more of polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, possibly polymerized with the aid of a starter molecule having two or more active hydrogen atoms, for example water, ammonia or compounds having a plurality of oxygen-hydrogen (OH) or nitrogen-hydrogen (NH) groups.

Referring now to FIG. 1, there are three examples of failure mode of an adhesive. Failure mode is defined as the mechanism of mechanical and/or adhesive bond failure within a test specimen. As an example, all test specimens represented in the Tables 1-4 were constructed from two 1"×6" sections of GAF Tri Ply SBS Granule modified bitumen membrane, and the two 1"×6" sections of modified bitumen membrane were adhered together using the moisture curable, non-bitumen and non-asphaltic based adhesive identified in the eighteen (18) set forth below. One-inch wide specimens were tested at a rate, both crosshead and chart speed, of two inches per minute using the adhesion test method set forth in American Section of the International Association for Testing Materials (ASTM) D-413 machine method. Failure mode of the test specimens was determined at a room temperature of approximately 23° C. In this context, the failure mode is summed into four categories.

First, adhesive failure 100 is defined as a failure of the adhesive bond at an interface between the adhesive material and a substrate characterized by a visual observation noting absence of adhesive material on at least one of the bonded surfaces of the test specimen. Second, cohesive failure 200 is defined as mechanical failure of the adhesive material while preserving the adhesive bond to the substrate characterized by a visual observation noting presence of the adhesive material on both bonded surfaces of the test specimen. Third, cohesive/adhesive failure is defined as a combination of mechanical failure in the adhesive material and adhesive bond failure at the interface of the adhesive material and the substrate characterized by a visual observation noting a mixture of both adhesive failure 100 and cohesive failure 200 on the bonded surfaces of the test specimen. Fourth, substrate failure 300 is defined as mechanical failure of the substrate while preserving integrity of both the adhesive bond and the cohesive bond of the adhesive material characterized by a visual observation noting the presence of substrate material still adhered to the adhesive material after the test specimen has been pulled apart. Adhesive failure 100 and cohesive failure 200 are primarily desired due to the fact that an adhesive composition which solubilizes the modified bitumen membrane too aggressively will compromise the integrity of the substrate, which is signified by the substrate failure 300 mode. A moisture curable, non-bitumen and non-asphaltic based adhesive is considered passing if the substrate failure 300 is less than 10% of the total failure mechanism in the peel.

Viscosity data was gathered for the moisture curable, non-bitumen and non-asphaltic based adhesive listed in examples 1-18 on an RVT Brookfield Viscometer using a C spindle at 1, 2 and 10 rotations per minute. Tensile strength and elongation were measured for the moisture curable, non-bitumen and non-asphaltic based adhesive listed in examples 1-18 in accordance with ASTM D 412 Method A using an Instron Tensile Tester. Sample securement was achieved through the use of pneumatic clamps which provide 200 psi force to minimize slippage of the test specimen during actual testing.

The following examples of moisture curable, non-bitumen and non-asphaltic based adhesive illustrate the embodiments in further detail, but do not limit the scope of the embodiments.

Example 1 is a single component, moisture curable, non-bitumen and non-asphaltic based adhesive for asphaltic membrane bonding from Tables 1-4, in accordance with the embodiments, was prepared in a formula utilizing the following ingredients and parts:

| Polymer | Momentive Y-15990 (SPUR) | 15.00 |
| Compatibilizer | PPG 725 (Polypropylene glycol) | 10.00 |
| Extender | Diisononyl Phthalate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 2 is a single component, moisture curable, non-bitumen and non-asphaltic based adhesive for asphaltic membrane bonding from Tables 1-4, in accordance with the embodiments, was prepared in a formula utilizing the following ingredients and parts:

| Polymer | Momentive Y-15990 (SPUR) | 15.00 |
| Compatibilizer | PPG 725 (Polypropylene glycol) | 10.00 |
| Extender | Eastman 168 (Dioctyl terephthalate) | 15.00 |
| Filler | G3T (CaCO3) | 57.00 |
| Antioxidant | Irganox 245 | 0.25 |
| Dehydration Agent | VTMO | 1.25 |

-continued

| | | |
|---|---|---|
| Adhesion Promoter | DAMO-T | 1.00 |
| Catalyst | DBTDL | 0.50 |

Example 3 is a single component, moisture curable, non-bitumen and non-asphaltic based adhesive for asphaltic membrane bonding from Tables 1-4, in accordance with the embodiments, was prepared in a formula utilizing the following ingredients and parts:

| | | |
|---|---|---|
| Polymer | Kaneka SAX 350 (STPE) | 15.00 |
| Compatibilizer | PPG 725 (Polypropylene glycol) | 10.00 |
| Extender | Eastman 168 (Dioctyl terephthalate) | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 4 is single component, moisture curable, non-bitumen and non-asphaltic based adhesive for asphaltic membrane bonding from Tables 1-4, in accordance with the embodiments, was prepared in a formula utilizing the following ingredients and parts:

| | | |
|---|---|---|
| Polymer | Momentive Y-15990 (SPUR) | 15.00 |
| Compatibilizer | PPG 725 (Polypropylene glycol) | 10.00 |
| Extender | tri(ethylene glycol) bis(2-ethylhexanoate) | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 5 is a single component, moisture curable, non-bitumen and non-asphaltic based adhesive for asphaltic membrane bonding from Tables 1-4, in accordance with the embodiments, was prepared in a formula utilizing the following ingredients and parts:

| | | |
|---|---|---|
| Polymer | Momentive Y-15990 (SPUR) | 15.00 |
| Compatibilizer | PPG 725 (Polypropylene glycol) | 10.00 |
| Extender | Bis(2-ethylhexyl) sebacate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 6 is a single component, moisture curable, non-bitumen and non-asphaltic based adhesive for asphaltic membrane bonding from Tables 1-4, in accordance with the embodiments, was prepared in a formula utilizing the following ingredients and parts:

| | | |
|---|---|---|
| Polymer | Kaneka SAX 350 (STPE) | 15.00 |
| Compatibilizer | PPG 725 (Polypropylene glycol) | 10.00 |
| Extender | Bis(2-ethylhexyl) sebacate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 7 is a single component, moisture curable, non-bitumen and non-asphaltic based adhesive for asphaltic membrane bonding from Tables 1-4, in accordance with the embodiments, was prepared in a formula utilizing the following ingredients and parts:

| | | |
|---|---|---|
| Polymer | Momentive Y-15990 (SPUR) | 15.00 |
| Compatibilizer | C-1090 (Polycarbonate polyol) | 10.00 |
| Extender | Diisononyl Phthalate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 8 is a single component, moisture curable, non-bitumen and non-asphaltic based adhesive for asphaltic membrane bonding from Tables 1-4, in accordance with the embodiments, was prepared in a formula utilizing the following ingredients and parts:

| | | |
|---|---|---|
| Polymer | Momentive Y-15990 (SPUR) | 15.00 |
| Compatibilizer | C-1090 (Polycarbonate polyol) | 10.00 |
| Extender | Eastman 168 (Dioctyl terephthalate) | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 9 is a single component, moisture curable, non-bitumen and non-asphaltic based adhesive for asphaltic membrane bonding from Tables 1-4, in accordance with the embodiments, was prepared in a formula utilizing the following ingredients and parts:

| | | |
|---|---|---|
| Polymer | Kaneka SAX 350 (STPE) | 15.00 |
| Compatibilizer | C-1090 (Polycarbonate polyol) | 10.00 |
| Extender | Eastman 168 (Dioctyl terephthalate) | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 10 is a single component, moisture curable, non-bitumen and non-asphaltic based adhesive for asphaltic membrane bonding from Tables 1-4, in accordance with the embodiments, was prepared in a formula utilizing the following ingredients and parts:

| | | |
|---|---|---|
| Polymer | Momentive Y-15990 (SPUR) | 15.00 |
| Compatibilizer | C-1090 (Polycarbonate polyol) | 10.00 |
| Extender | tri(ethylene glycol) bis(2-ethylhexanoate) | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 11 is a single component, moisture curable, non-bitumen and non-asphaltic based adhesive for asphaltic membrane bonding from Tables 1-4, in accordance with the embodiments, was prepared in a formula utilizing the following ingredients and parts:

| | | |
|---|---|---|
| Polymer | Momentive Y-15990 (SPUR) | 15.00 |
| Compatibilizer | C-1090 (Polycarbonate polyol) | 10.00 |

| Extender | Bis(2-ethylhexyl) sebacate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 12 is a single component, moisture curable, non-bitumen and non-asphaltic based adhesive for asphaltic membrane bonding from Tables 1-4, in accordance with the embodiments, was prepared in a formula utilizing the following ingredients and parts:

| Polymer | Kaneka SAX 350 (STPE) | 15.00 |
| Compatibilizer | C-1090 (Polycarbonate polyol) | 10.00 |
| Extender | Bis(2-ethylhexyl) sebacate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 13 is a single component, moisture curable, non-bitumen and non-asphaltic based adhesive for asphaltic membrane bonding from Tables 1-4, in accordance with the embodiments, was prepared in a formula utilizing the following ingredients and parts:

| Polymer | Momentive Y-15990 (SPUR) | 15.00 |
| Compatibilizer | P-1010 (Adipate glycol) | 10.00 |
| Extender | Diisononyl Phthalate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 14 is a single component, moisture curable, non-bitumen and non-asphaltic based adhesive for asphaltic membrane bonding from Tables 1-4, in accordance with the embodiments, was prepared in a formula utilizing the following ingredients and parts:

| Polymer | Momentive Y-15990 (SPUR) | 15.00 |
| Compatibilizer | P-1010 (Adipate glycol) | 10.00 |
| Extender | Eastman 168 (Dioctyl terephthalate) | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 15 is a single component, moisture curable, non-bitumen and non-asphaltic based adhesive for asphaltic membrane bonding from Tables 1-4, in accordance with the embodiments, was prepared in a formula utilizing the following ingredients and parts:

| Polymer | Kaneka SAX 350 (STPE) | 15.00 |
| Compatibilizer | P-1010 (Adipate glycol) | 10.00 |
| Extender | Eastman 168 (Dioctyl terephthalate) | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 16 is a single component, moisture curable, non-bitumen and non-asphaltic based adhesive for asphaltic membrane bonding from Tables 1-4, in accordance with the embodiments, was prepared in a formula utilizing the following ingredients and parts:

| Polymer | Momentive Y-15990 (SPUR) | 15.00 |
| Compatibilizer | P-1010 (Adipate glycol) | 10.00 |
| Extender | tri(ethylene glycol) bis(2-ethylhexanoate) | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 17 is a single component, moisture curable, non-bitumen and non-asphaltic based adhesive for asphaltic membrane bonding from Tables 1-4, in accordance with the embodiments, was prepared in a formula utilizing the following ingredients and parts:

| Polymer | Momentive Y-15990 (SPUR) | 15.00 |
| Compatibilizer | P-1010 (Adipate glycol) | 10.00 |
| Extender | Bis(2-ethylhexyl) sebacate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Example 18 is a single component, moisture curable, non-bitumen and non-asphaltic based adhesive for asphaltic membrane bonding from Tables 1-4, in accordance with the embodiments, was prepared in a formula utilizing the following ingredients and parts:

| Polymer | Kaneka SAX 350 (STPE) | 15.00 |
| Compatibilizer | P-1010 (Adipate glycol) | 10.00 |
| Extender | Bis(2-ethylhexyl) sebacate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Examples 1-18 prepared from the moisture curable, non-bitumen and non-asphaltic based adhesive listed above are identified as Examples 1-18 in Table 1 below. Table 1 shows a comparison of peel adhesion properties obtained on GAF Tri Ply SBS Granule modified bitumen membrane using the moisture curable, non-bitumen and non-asphaltic based adhesive identified in Examples 1-18.

TABLE 1

| Adhesion Peel Data | | |
| --- | --- | --- |
| ASTM D 413 | 1 week | 3 week |
| Example 1 | 3.84 lbf | 4.74 lbf |
| Example 2 | 3.62 lbf | 4.92 lbf |
| Example 3 | 4.56 lbf | 4.75 lbf |
| Example 4 | 3.95 lbf | 4.01 lbf |

TABLE 1-continued

| Adhesion Peel Data | | |
|---|---|---|
| ASTM D 413 | 1 week | 3 week |
| Example 5 | 3.83 lbf | 3.84 lbf |
| Example 6 | 4.71 lbf | 4.78 lbf |
| Example 7 | 1.75 lbf | 2.93 lbf |
| Example 8 | 2.24 lbf | 2.33 lbf |
| Example 9 | 3.67 lbf | 3.83 lbf |
| Example 10 | 4.01 lbf | 3.26 lbf |
| Example 11 | 2.08 lbf | 2.67 lbf |
| Example 12 | 4.66 lbf | 3.95 lbf |
| Example 13 | 1.85 lbf | 2.55 lbf |
| Example 14 | 1.91 lbf | 2.19 lbf |
| Example 15 | 2.19 lbf | 2.73 lbf |
| Example 16 | 2.66 lbf | 2.12 lbf |
| Example 17 | 1.90 lbf | 3.20 lbf |
| Example 18 | 2.94 lbf | 3.81 lbf |

Examples 1-18 prepared from the moisture curable, non-bitumen and non-asphaltic based adhesive listed in the Examples are identified as Examples 1-18 in Table 2 below. Table 2 shows a comparison of failure modes for each test specimen obtained on GAF Tri Ply SBS Granule modified bitumen membrane using the moisture curable, non-bitumen and non-asphaltic based adhesive identified in Examples 1-18.

TABLE 2

| Failure Mode | | |
|---|---|---|
| ASTM D 413 | 1 week | 3 week |
| Example 1 | Adhesive Failure | Adhesive Failure |
| Example 2 | Adhesive Failure | Adhesive Failure |
| Example 3 | Cohesive Failure | Cohesive Failure |
| Example 4 | Adhesive Failure | Adhesive Failure |
| Example 5 | Adhesive Failure | Adhesive Failure |
| Example 6 | Adhesive Failure | Adhesive Failure |
| Example 7 | Adhesive Failure | Adhesive Failure |
| Example 8 | Adhesive Failure | Adhesive Failure |
| Example 9 | Adhesive Failure | Adhesive Failure |
| Example 10 | Adhesive Failure | Adhesive Failure |
| Example 11 | Adhesive Failure | Adhesive Failure |
| Example 12 | Adhesive Failure | Adhesive Failure |
| Example 13 | Adhesive Failure | Adhesive Failure |
| Example 14 | Adhesive Failure | Adhesive Failure |
| Example 15 | Adhesive Failure | Adhesive Failure |
| Example 16 | Adhesive Failure | Adhesive Failure |
| Example 17 | Adhesive Failure | Adhesive Failure |
| Example 18 | Cohesive Failure | Cohesive/Adhesive Failure |

Examples 1-18 prepared from the moisture curable, non-bitumen and non-asphaltic based adhesive listed in the Examples are identified as Examples 1-18 in Table 3 below. Table 3 shows a comparison of viscosities for each moisture curable, non-bitumen and non-asphaltic based adhesive identified in Examples 1-18 on an RVT Brookfield Viscometer using a C spindle at 1, 2 and 10 rpms.

TABLE 3

| Viscosity Data | | | |
|---|---|---|---|
| Brookfield | 1 rpm (cP) | 2 rpm (cP) | 10 rpm (cP) |
| Example 1 | 71,000 | 51,500 | 28,100 |
| Example 2 | 87,000 | 62,000 | 29,500 |
| Example 3 | 60,000 | 38,000 | 14,500 |
| Example 4 | 77,000 | 50,000 | 20,000 |
| Example 5 | 73,000 | 48,500 | 21,300 |
| Example 6 | 47,000 | 30,000 | 11,500 |
| Example 7 | 261,000 | 184,000 | NA |
| Example 8 | 291,000 | 209,500 | NA |
| Example 9 | 210,000 | 129,000 | 48,200 |
| Example 10 | 200,000 | 135,000 | 60,700 |
| Example 11 | 193,000 | 129,500 | 57,700 |
| Example 12 | 170,000 | 99,000 | 37,200 |
| Example 13 | 103,000 | 74,000 | 31,700 |
| Example 14 | 119,000 | 83,000 | 37,600 |
| Example 15 | 114,000 | 71,000 | 27,700 |
| Example 16 | 86,000 | 54,000 | 24,000 |
| Example 17 | 85,000 | 60,000 | 27,100 |
| Example 18 | 90,000 | 50,500 | 19,100 |

Examples 1-18 prepared from the moisture curable, non-bitumen and non-asphaltic based adhesive are identified as Examples 1-18 in Table 4 below. Table 4 shows a comparison of modulus at 100% elongation, tensile at break and ultimate elongation using the moisture curable, non-bitumen and non-asphaltic based adhesive identified in Examples 1-18 in accordance with ASTM D 412 Method A using Table Model 3345 Instron Universal Tester.

TABLE 4

| Tensile/Elongation | | | |
|---|---|---|---|
| ASTM D 413 | M100 (psi) | Tensile at break (psi) | Elongation (%) |
| Example 1 | 52 | 138 | 555 |
| Example 2 | 56 | 146 | 616 |
| Example 3 | 56 | 89 | 377 |
| Example 4 | 55 | 128 | 613 |
| Example 5 | 60 | 143 | 611 |
| Example 6 | 50 | 85 | 420 |
| Example 7 | 45 | 110 | 588 |
| Example 8 | 61 | 125 | 602 |
| Example 9 | 69 | 80 | 407 |
| Example 10 | 56 | 115 | 639 |
| Example 11 | 66 | 127 | 626 |
| Example 12 | 70 | 80 | 424 |
| Example 13 | 54 | 135 | 715 |
| Example 14 | 59 | 132 | 689 |
| Example 15 | 53 | 56 | 199 |
| Example 16 | 50 | 114 | 621 |
| Example 17 | 58 | 116 | 632 |
| Example 18 | 58 | 72 | 383 |

The following comparative examples illustrate the invention in further detail, but do not limit the scope of the embodiments. A comparative example of a single component, moisture curable, non-bitumen and non-asphaltic based adhesive for asphaltic membrane bonding in accordance with the embodiments was prepared in a formula utilizing the following ingredients:

| Comparative Example 1 | | |
|---|---|---|
| | | Parts |
| Polymer | Momentive Y-15990 (SPUR) | 15.00 |
| Compatibilizer | PPG 725 (Polypropylene glycol) | 2.5 |
| Extender | Diisononyl Phthalate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

A comparative example of a single component, moisture curable, non-bitumen and non-asphaltic based adhesive for asphaltic membrane bonding in accordance with the invention was prepared in a formula utilizing the following ingredients:

Comparative Example 2

| | | Parts |
|---|---|---|
| Polymer | Momentive Y-15990 (SPUR) | 15.00 |
| Compatibilizer | PPG 725 (Polypropylene glycol) | 0.0 |
| Extender | Diisononyl Phthalate | 15.00 |
| Filler | G3T (CaCO3) | 57.00 |
| Antioxidant | Irganox 245 | 0.25 |
| Dehydration Agent | VTMO | 1.25 |
| Adhesion Promoter | DAMO-T | 1.00 |
| Catalyst | DBTDL | 0.50 |

Adhesion peel data for Comparative Examples 1 and 2 is listed in Table 5 below. All adhesion peel specimens were constructed and tested in accordance with the adhesion peel test procedure defined above using ASTM D 413.

TABLE 5

Adhesion Peel Data

| ASTM D 413 | 1 week | 3 week |
|---|---|---|
| Comparative Example 1 | 4.78 lbf | 4.89 lbf |
| Comparative Example 2 | 3.32 lbf | 5.54 lbf |

Table 6 shows a comparison of failure modes for each test specimen obtained on GAF Tri Ply SBS Granule modified bitumen membrane using the moisture curable, non-bitumen and non-asphaltic based adhesive identified in Comparative Examples 1 and 2. Failure mode was tested and evaluated in accordance with the definition outlined above using ASTM D 413.

TABLE 6

Failure Mode

| ASTM D 413 | 1 week | 3 week |
|---|---|---|
| Comparative Example 1 | Adhesive Failure | 90% Adhesive Failure/ 10% Substrate Failure |
| Comparative Example 2 | 80% Adhesive Failure/ 20% Substrate Failure | 40% Adhesive Failure/ 60% Substrate Failure |

As can be seen in Table 6 above Comparative Examples 1 and 2 both demonstrated substrate failure after three weeks of conditioning under ambient temperature (i.e. approximately 23 degrees Celsius). After one week of conditioning, only Comparative Example 2 showed signs of substrate failure demonstrating an inverse correlation between migration of the extender and the loading level of compatibilizer in the moisture curable, non-bitumen and non-asphaltic based adhesive.

The identity, manufacturer and location of all ingredients used in Examples 1-18 and Comparative Examples 1 and 2 are identified below in Table 7.

TABLE 7

| Ingredient | Manufacturer | Location |
|---|---|---|
| STPE (SAX 350) | Kaneka | Japan |
| SPUR (Y-15990) | Momentive | United States |

TABLE 7-continued

| Ingredient | Manufacturer | Location |
|---|---|---|
| Polypropylene glycol (PPG 725) | Covestro | United States |
| Adipate glycol (P-1010) | Kuraray | Japan |
| Polycarbonate polyol (C-1090) | Kuraray | Japan |
| Diisononyl Phthalate (Plasthall DINP) | Hallstar | United States |
| Dioctyl terephthalate (Eastman 168) | Eastman | United States |
| Triethylene glycol bis (2-ethylhexanoate) | Sigma Aldrich | United States |
| Bis(2-ethylhexyl)sebacate | Sigma Aldrich | United States |
| Calcium Carbonate (G3T) | Huber | United States |
| Antioxidant (Irganox 245) | BASF | United States |
| Vinyltrimethoxysilane (VTMO) | Momentive | United States |
| Aminosilane (DAMO-T) | Momentive | United States |
| Dibutyltin dilaurate (Dabco T-12) | Galata Chem. | United States |

The foregoing description merely explains and illustrates the invention and the invention is not limited thereto except insofar as the appended claims are so limited, as those skilled in the art who have the disclosure before them will be able to make modifications without departing from the scope of the invention.

While considerable emphasis has been placed herein on the structures and configurations of the preferred embodiments of the invention, it will be appreciated that other embodiments, as well as modifications of the embodiments disclosed herein, can be made without departing from the principles of the invention. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

What is claimed:

1. A moisture curable, non-bitumen and non-asphaltic based adhesive, said moisture curable, non-bitumen and non-asphaltic based adhesive comprising at least 4 wt. % extender, at least 2 wt. % compatibilizer, at least 10 wt. % polymer, and less than 0.5 wt. % asphalt, bitumen, and/or coal tar, said polymer including reactive silyl groups, said extender including esters of polybasic acids, esters of polyhydric alcohol, fatty acid oils, fatty acid esters, aromatic carboxylic acid esters, and/or aliphatic carboxylic acid esters; said compatibilizer including adipate glycols, carbonate glycols, and/or olefinic glycols, said moisture curable, non-bitumen and non-asphaltic based adhesive including less than 0.5 wt. % volatile organic compounds; said moisture curable, non-bitumen and non-asphaltic based adhesive including less than 0.5 wt. % isocyanate groups.

2. The moisture curable, non-bitumen and non-asphaltic based adhesive as defined in claim 1, wherein said moisture curable, non-bitumen and non-asphaltic based adhesive comprises 4-45 wt. % extender, 2-45 wt. % compatibilizer, and 10-31 wt. % polymer, one or more of said reactive silyl groups in said polymer are selected from the group consisting of a polyether having reactive silyl groups, a polyurethane having reactive silyl groups, and a polyester having reactive silyl groups.

3. The moisture curable, non-bitumen and non-asphaltic based adhesive as defined in claim 1, wherein said moisture curable, non-bitumen and non-asphaltic based adhesive further includes one or more of adhesion promoter, antioxidant, catalyst, dehydration agent, filler and/or tackifier.

4. The moisture curable, non-bitumen and non-asphaltic based adhesive as defined in claim 3, wherein said moisture curable, non-bitumen and non-asphaltic based adhesive includes one or more of at least 0.01 wt. % adhesion promoter, at least 0.001 wt. % antioxidant, at least 0.1 wt. % catalyst, at least 0.05 wt. % dehydration agent, at least 20 wt. % filler, and/or at least 0.01 wt. % tackifier.

5. The moisture curable, non-bitumen and non-asphaltic based adhesive as defined in claim 3, wherein said moisture curable, non-bitumen and non-asphaltic based adhesive further includes 0.01-4 wt. % adhesion promoter, 0.05-0.5 wt. % antioxidant, 0.05-2 wt. % dehydration agent, 20-70 wt. % filler, and 0.1-1 wt. % catalyst.

6. The moisture curable, non-bitumen and non-asphaltic based adhesive as defined in claim 3, wherein said moisture curable, non-bitumen and non-asphaltic based adhesive further includes 0.01-0.1 wt. % adhesion promoter, 0.05-0.35 wt. % antioxidant, 0.05-0.3 wt. % dehydration agent, 20-35 wt. % filler, and 0.1-0.4 wt. % catalyst.

7. The moisture curable, non-bitumen and non-asphaltic based adhesive as defined in claim 3, wherein said moisture curable, non-bitumen and non-asphaltic based adhesive includes tackifier.

8. The moisture curable, non-bitumen and non-asphaltic based adhesive as defined in claim 7, wherein said tackifier includes one or more compounds selected from the group consisting of naphthenic oil and aromatic resins.

9. The moisture curable, non-bitumen and non-asphaltic based adhesive as defined in claim 1, wherein said moisture curable, non-bitumen and non-asphaltic based adhesive forms a peel strength with a roofing membrane that is greater than 1 pli.

10. The moisture curable, non-bitumen and non-asphaltic based adhesive as defined in claim 9, wherein said moisture curable, non-bitumen and non-asphaltic based adhesive forms a peel strength with a roofing membrane that is greater than 2 pli.

11. The moisture curable, non-bitumen and non-asphaltic based adhesive as defined in claim 1, wherein a weight ratio of said extender to said compatibilizer is 1:1 to 5:1.

12. The moisture curable, non-bitumen and non-asphaltic based adhesive as defined in claim 1, wherein said compatibilizer includes one or more compounds selected from the group consisting of adipate glycols, carbonate glycols paraffinic and olefinic glycols.

13. The moisture curable, non-bitumen and non-asphaltic based adhesive as defined in claim 1, wherein said extender includes one or more compounds selected from the group consisting of polybasic acids and polyhydric alcohols.

14. The moisture curable, non-bitumen and non-asphaltic based adhesive as defined in claim 1, wherein said polymer includes an α, Ω telechelic silyl-terminated polymer.

15. The moisture curable, non-bitumen and non-asphaltic based adhesive as defined in claim 1, wherein said moisture curable, non-bitumen and non-asphaltic based adhesive includes less than 0.05 wt. % volatile organic compounds.

16. The moisture curable, non-bitumen and non-asphaltic based adhesive as defined in claim 1, wherein said moisture curable, non-bitumen and non-asphaltic based adhesive includes less than 0.05 wt. % isocyanate groups.

17. An adhered roofing system comprising:
   i. a roof substrate;
   ii. a roofing membrane; and
   iii. a cured adhesive, said cured adhesive is a cured product of a moisture curable, non-bitumen and non-asphaltic based adhesive, said moisture curable, non-bitumen and non-asphaltic based adhesive comprises at least 4 wt. % extender, at least 2 wt. % compatibilizer, at least 10 wt. % polymer, and less than 0.5 wt. % asphalt, bitumen, and/or coal tar, said polymer including reactive silyl groups, said extender including esters of polybasic acids, esters of polyhydric alcohol, fatty acid oils fatty acid esters, aromatic carboxylic acid esters, and/or aliphatic carboxylic acid esters; said compatibilizer including adipate glycols, carbonate glycols, and/or olefinic glycols, said moisture curable, non-bitumen and non-asphaltic based adhesive including less than 0.5 wt. % volatile organic compounds; said moisture curable, non-bitumen and non-asphaltic based adhesive including, less than 0.5 wt. % isocyanate groups.

18. The adhered roofing system as defined in claim 17, wherein said moisture curable, non-bitumen and non-asphaltic based adhesive comprises 4-45 wt. % extender, 2-45 wt. % compatibilizer, and 10-31 wt. % polymer, one or more of said reactive silyl groups in said polymer are selected from the group consisting of a polyether having reactive silyl groups, a polyurethane having reactive silyl groups, and a polyester having reactive silyl groups.

19. The adhered roofing system as defined in claim 17, wherein said moisture curable, non-bitumen and non-asphaltic based adhesive further includes one or more of adhesion promoter, antioxidant, catalyst, dehydration agent, filler and/or tackifier.

20. The adhered roofing system as defined in claim 19, wherein said moisture curable, non-bitumen and non-asphaltic based adhesive further includes one or more of at least 0.01 wt. % adhesion promoter, at least 0.001 wt. % antioxidant, at least 0.1 wt. % catalyst, at least 0.05 wt. % dehydration agent, at least 20 wt. % filler, and/or at least 0.01 wt. % tackifier.

21. The adhered roofing system as defined in claim 19, wherein said moisture curable, non-bitumen and non-asphaltic based adhesive further includes 0.01-4 wt. % adhesion promoter, 0.05-0.5 wt. % antioxidant, 0.05-2 wt. % dehydration agent, 20-70 wt. % filler, and 0.1-1 wt. % catalyst.

22. The adhered roofing system as defined in claim 19, wherein said moisture curable, non-bitumen and non-asphaltic based adhesive further includes 0.01-0.1 wt. % adhesion promoter, 0.05-0.35 wt. % antioxidant, 0.05-0.3 wt. % dehydration agent, 20-35 wt. % filler, and 0.1-0.4 wt. % catalyst.

23. The adhered roofing system as defined in claim 17, wherein a peel strength of said roofing membrane and said adhesive is greater than 1 pli.

24. The adhered roofing system as defined in claim 17, wherein said roof membrane is a modified bitumen membrane or an EPDM polymer membrane.

25. A one part moisture curable adhesive comprising 10-31 wt. % polymer, 4-45 wt. % extender, 2-45 wt. % compatibilizer, 0.01-4 wt. % adhesion promoter, 0.001-5 wt. % antioxidant, 0.01-1 wt. % catalyst, 0.05-2 wt. % dehydration agent, 20-70 wt. % filler, and; said one part moisture curable adhesive including less than 0.5 wt. % asphalt, bitumen, and/or coal tar; said one part moisture curable adhesive including less than 0.5 wt. % volatile organic compounds; said one part moisture curable adhesive including less than 0.5 wt. % isocyanate groups; said polymer including silylated polyurethane, silylated polyether, silylated acrylic, and/or silylated polyester; said extender including esters of polybasic acids, esters of polyhydric alcohol, fatty acid oils, fatty acid esters, aromatic carboxylic acid esters, and/or aliphatic carboxylic acid esters; said compatibilizer including adipate glycols, carbonate glycols, and/or olefinic glycols; said adhesion promoter including silane coupling groups; said catalyst formulated to promote curing of silyl-terminated groups in said polymer.

26. The one part moisture curable adhesive as defined in claim 25, wherein said one part moisture curable adhesive includes less than 0.05 wt. % volatile organic compounds and less than 0.05 wt. % isocyanate groups.

27. The one part moisture curable adhesive as defined in claim 26, wherein a weight ratio of said extender to said compatibilizer is 1.1:1 to 2:1.

28. An adhered roofing system comprising:
   i. a roof substrate;
   ii. a roofing membrane; and
   iii. a cured adhesive securing said roofing membrane to said roof substrate, said cured adhesive is a cured product of a one part moisture curable adhesive, said one part moisture curable adhesive comprising 10-31 wt. % polymer, 4-45 wt. % extender, 2-45 wt. % compatibilizer, 0.01-4 wt. % adhesion promoter, 0.001-5 wt. % antioxidant, 0.01-1 wt. % catalyst, 0.05-2 wt. % dehydration agent, 20-70 wt. % filler, and; said one part moisture curable adhesive including less than 0.5 wt. % asphalt, bitumen, and/or coal tar; said one part moisture curable adhesive including less than 0.5 wt. % volatile organic compounds; said one part moisture curable adhesive including less than 0.5 wt. % isocyanate groups; said polymer including silylated polyurethane, silylated polyether, silylated acrylic, and/or silylated polyester; said extender including esters of polybasic acids, esters of polyhydric alcohol, fatty acid oils, fatty acid esters, aromatic carboxylic acid esters, and/or aliphatic carboxylic acid esters; said compatibilizer including adipate glycols, carbonate glycols, and/or olefinic glycols; said adhesion promoter including silane coupling groups; said catalyst formulated to promote curing of silyl-terminated groups in said polymer.

29. The adhered roofing system as defined in claim 28, wherein said one part moisture curable adhesive includes less than 0.05 wt. % volatile organic compounds and less than 0.05 wt. % isocyanate groups.

30. The adhered roofing system as defined in claim 29, wherein a weight ratio of said extender to said compatibilizer is 1.1:1 to 2:1.

31. The adhered roofing system as defined in claim 30, wherein a peel strength of said roofing membrane connected to said roof substrate by said adhesive is greater than 1 pli.

32. The adhered roofing system as defined in claim 31, wherein said roof membrane is a modified bitumen membrane or an EPDM polymer membrane.

* * * * *